(12) United States Patent
Chesson

(10) Patent No.: US 10,334,320 B2
(45) Date of Patent: Jun. 25, 2019

(54) INTERACTIVE DIGITAL PLATFORM, SYSTEM, AND METHOD FOR IMMERSIVE CONSUMER INTERACTION WITH OPEN WEB VIDEO PLAYER

(71) Applicant: Duzy IOD LLC, Florham Park, NJ (US)

(72) Inventor: Peter L. Chesson, Florham Park, NJ (US)

( * ) Notice: Subject to any disclaimer, the term of this patent is extended or adjusted under 35 U.S.C. 154(b) by 0 days.

(21) Appl. No.: 15/898,916

(22) Filed: Feb. 19, 2018

(65) Prior Publication Data

US 2019/0090025 A1    Mar. 21, 2019

Related U.S. Application Data

(60) Provisional application No. 62/560,397, filed on Sep. 19, 2017.

(51) Int. Cl.
| | | |
|---|---|---|
| H04N 21/236 | (2011.01) | |
| H04N 21/64 | (2011.01) | |
| H04L 12/741 | (2013.01) | |
| H04N 21/478 | (2011.01) | |
| H04N 21/466 | (2011.01) | |
| G06F 3/0481 | (2013.01) | |
| H04N 21/4725 | (2011.01) | |

(52) U.S. Cl.
CPC ... *H04N 21/47815* (2013.01); *G06F 3/04817* (2013.01); *H04N 21/466* (2013.01); *H04N 21/4725* (2013.01)

(58) Field of Classification Search
CPC .......... H04N 21/23424; H04N 5/2723; H04N 21/2542; H04N 21/47815; H04N 21/43637; H04N 21/4781; H04N 21/4786; H04N 21/6587; H04N 21/8173; H04N 21/236; H04N 21/64; H04L 45/74
See application file for complete search history.

(56) References Cited

U.S. PATENT DOCUMENTS

| | | |
|---|---|---|
| 6,169,542 B1 | 1/2001 | Hooks et al. |
| 7,536,705 B1 | 5/2009 | Boucher et al. |
| 8,041,717 B2 | 10/2011 | Ramer et al. |
| 8,312,486 B1 | 11/2012 | Briggs et al. |
| 8,533,753 B2 | 9/2013 | Briggs et al. |
| 8,549,555 B2 | 10/2013 | Briggs et al. |
| 8,782,690 B2 | 7/2014 | Briggs et al. |
| 8,893,173 B2 | 11/2014 | Briggs et al. |
| 9,351,032 B2 | 5/2016 | Briggs et al. |
| 2002/0120925 A1* | 8/2002 | Logan ............ A23L 2/52 725/9 |
| 2003/0028873 A1* | 2/2003 | Lemmons ......... H04N 7/17318 725/36 |

(Continued)

*Primary Examiner* — Rong Le
(74) *Attorney, Agent, or Firm* — Fein, Such, Kahn & Shepard, P.C.; Jack B. Baldini, Esq.

(57) ABSTRACT

A digital media player and sales platform, system and method, enabled for use on the open web as well as in closed applications configured to provide end users an immersive interactive experience wherein the end users have the ability to engage with video content items, including the ability to purchase items, as and when they choose, all within the confines of the player and entirely within the viewing experience, all functionality fully enabled from the moment the media is loaded for play not tied to any media timeline or media player push to engage.

9 Claims, 12 Drawing Sheets

(56) References Cited

U.S. PATENT DOCUMENTS

| | | | |
|---|---|---|---|
| 2013/0061262 A1* | 3/2013 | Briggs | H04N 21/435 725/32 |
| 2014/0214920 A1* | 7/2014 | Wong | H04N 21/47202 709/203 |
| 2015/0289022 A1* | 10/2015 | Gross | H04N 21/4725 725/51 |
| 2018/0027305 A1* | 1/2018 | Bagheri | H04N 21/8126 |

* cited by examiner

INTERACTIVE DIGITAL PLATFORM, SYSTEM, AND METHOD FOR IMMERSIVE CONSUMER INTERACTION WITH OPEN WEB VIDEO PLAYER

FIELD OF THE INVENTION

A digital media player and sales platform, system and method, enabled for use on the open web as well as in closed applications configured to provide end users an immersive interactive experience wherein the end users have the ability to engage with video content items, including the ability to purchase items, as and when they choose, all within the confines of the player and entirely within the viewing experience, all functionality fully enabled from the moment the media is loaded for play not tied to any media timeline or media player push to engage.

BACKGROUND

Media transmission, and video playback, through television, Internet websites, mobile applications, and on computers, tablets, smartphones, and the like, has become mainstream technology and consumers and users of such technology have come to expect the ability to view video content on any information technology platform. Video content distribution has become ubiquitous and anyone with a smartphone or other video capable capture device and/or video playback capable device, can post video content on such websites as YouTube® or share with others by simply sending the video file and others utilizing any of various media players, who can then press play and view such content.

However, users of such media players and viewers of such media content have limited ability to actually interact in a meaningful way with the content. Such interaction may include zooming in, fast forwarding, reversing, pausing or capturing still images. But users typically do not have the ability to interact with specific media content items embedded within the content, view the video content they choose, or control their viewing experience. In some instances, users may be prompted by timeline dependent cues to interact with certain elements, i.e., when the video gets to a certain spot along its timeline, a viewer may be prompted to engage with a suggested advertisement—see it or skip? However, there is no current technology that allows users complete flexibility, not dependent on timeline cues, to view or not view enabled extra features, and all within the player functionality.

Attempts have been made to increase viewer interactive capability. For example, in U.S. Pat. No. 6,169,542, entitled, Method of Delivering Advertising Through an Interactive Video Distribution System, issued Jan. 2, 2001, disclosed is, "an interactive video distribution system include[ing] a plurality of interactive video subscriber units, a head end facility, and a video distribution medium. The head end facility is configured to transmit advertisements in connection with an interactive video program and receive requests from one of the subscriber units to register the advertisements in a menu. In response to each of the requests, the head end facility generates a entries associated with the advertisements in the menu, The menu is communicated in a first video still image to the subscriber unit through the medium. The head end facility is further configured to obtain a selection request for one of the entries and provide supplementary advertising information associated with the selected one of advertisements to the subscriber unit."

In another example, U.S. Pat. No. 7,536,705 entitled, System and Method for Interactive Distribution of Selectable Presentations, issued May 19, 2009, discloses, "a data storage, multiplexing, and distribution method is provided for use in a digital data distribution system. The system provides simultaneous transmission of a plurality of uniquely identified, independent data streams within an assigned channel bandwidth of local, metropolitan and wide area distribution media. The independent data streams can include presentations specifically requested by the receiving user. Upon request from some number of users from their premises, the system assembles a combination of optional image elements such as motion and still frame video, background and description audio, text and graphical overlays into presentation data stream appropriate to the user requests. Individual data streams are multiplexed within a higher bandwidth data stream for simultaneous delivery within the bandwidth assigned for this data transmission. The techniques unique to this system, in regard to storage, timing and synchronization, can be implemented using techniques described within the MPEG profile."

In another example, U.S. Pat. No. 8,041,717 entitled, Mobile Advertisement Syndication, issued Oct. 18, 2011, "improved mobile advertisement syndication capabilities are disclosed for mobile communication facilities, such as cell phones. These and other capabilities are employed to improve delivery of mobile advertisements and their syndication, such as associating advertising content with websites, to appropriate or desirable mobile communication facilities."

In a combination of examples, U.S. Pat. Nos. 8,312,486, 8,533,753, 8,549,555, 8,782,690, 8,893,173, and 9,351,032, all entitled the same as Interactive Product Placement System and Method Therefor, inventor(s) Christian Briggs, et al, discloses, inter alia, "a method for presenting advertisements for commercial products in video production, whereby the commercial product is placed in the video production as an element of the video production. A viewer is enabled to interact with the video production to select the product. Information is then displayed about the selected product and the viewer is enabled to purchase the selected product." (Collectively, the "Briggs' Patents").

While others have increased technical video playback and increased efficiency of bandwidth, storage, and timing and synchronization, and the like, only the Briggs' Patents have disclosed a system and method for presenting product placement in a video playback as an element of the video production whereby a viewer is enabled to interact with a specific product within the video production. However, the Briggs' Patents are enabled through cue point triggering and a process supplemented "with an information and product integrated timeline residing, under the video production. At the triggered cue point, watermarked icons/logos appear under the video production. Users can interact with the icons to garner more information about a particular character, location, or advertisers at a specific point in the feature presentation employing [calls for interactive product ads] . . . . Once the life cycle of the ad expires, or the ad is clicked or presented to the end user, the advertisement will destroy itself, leaving the viewer with the impression that there was never a break in the viewing experience." However, in order to purchase any such product, the viewer leaves the viewing experience and goes directly to a linked third party sales website to transact and then return to the viewer. Moreover, in order to purchase more than one item enabled in a video, this process is repeated and there may be many third party websites to visit outside the player in order to transact this business.

The current disclosure does not teach a timeline dependent overlay (or underlay, as the case may be) with cue point triggers along a timeline, nor does it disclose calling for advertisements being displayed as a result of those cue point triggers, nor does it disclose advertisements that destroy themselves or otherwise having a 'life cycle' other than the length of the video playing itself through from beginning to end. Here, once enabled, the advertisements and other interactive processes are available immediately, from the moment play is pressed until the video is over, or, at any point, and repeatedly, or never, as much as a user of the technology may determine, at the complete and sole discretion of such user. And, if a user were to decide to want to purchase any advertised product, they would be able to do so from within the player itself, not having to go to any third party website and not having to login to, or deal with, any other entity than the one enabled by logging into the player in the first instance. The viewing and purchasing experience is seamless.

Here, the disclosure overcomes the limitations of timeline dependent cue point triggers and the calling from an ad server, advertisements to be displayed and then discarded. Disclosed here is a truly 'interactive on demand' ("IOD") experience allowing viewers to dictate how and when they engage with the player. Upon loading an enabled video of the instant disclosure, the player will have already used machine learning algorithms to determine which video, API Commerce Feed and search query data (intent based on machine learning and first party data) to populate within the player solution. At no time is any potential marketer or advertiser, or the player itself, dictating via a predetermined timeline when cue point triggers are enabled or a viewer will otherwise see or engage (or not) with interactive media campaigns. In fact, while utilizing seemingly interactive and choice dependent technology, the Briggs' Patents disclose a technology that still (like typical television advertising) dictates when and how a viewer may encounter an advertisement, with the only advancement being that the viewer may choose not to interact and view the advertisement, as well as enabling an 'order here' functionality in the case that the viewer did indeed choose to view the advertisement (although that 'order here' functionality is actually 'order through this link' functionality and the user is directed to an outside third party website temporarily leaving the viewer). Whereas, here, the viewer initiates player interaction at any point within the viewing experience, having a choice of one or a plurality of cue objects within which to interact, at any point during the viewing experience, or multiple times during the viewing experience, all without the need to 'call' advertisements from an ad server, and also enabling the true 'order here' functionality. Here, the 'order here' functionality is truly 'order here'. There is no direction to an outside website. Logged into the player, the player has payment handler capability and order fulfillment functionality so the purchasing is all done within the player itself.

The technology disclosed here delivers new digital technologies that create new standards in how we not only view, but are able to interact with media. This technology enables a 'smart' online shopping experience. A viewer becomes interested in a particular product because of the video production—an actor wearing a particular pair of sunglasses, or riding a particular kind of bicycle, or demonstrating a particular piece of jewelry, or hitting a particular kind of golf ball, or simply eating a slice of pizza. The advertisement is not first. The use or display of the product is first. The viewer becomes interested by seeing the product in action and clicks on the product or through a menu bar determines if indeed the interesting product or service is a cue object and enabled for more information and/or immediate purchasing. Without leaving the viewer, the viewer is enabled with information about the clickable or cue enabled product (a cue object and not a cue trigger along a timeline—at any point in the video, whenever the object is visible, it may be directly clickable, and even when not viewable, at all times clickable through a user enabled menu option) and a viewer, upon garnering enough interest simply upon seeing the use or display of the product thinks, hey, I wonder where I can buy that, or how much would it be, or what are the specifications for that product, what colors is it available, etc., clicks on the product (or through the proprietary player menu) and within the player itself, without having to call information from an ad server, the player displays the relevant information, including an option to purchase. If the user then wants to purchase, he clicks purchase and the purchase is complete because an enabled, logged into, payment handler, transacts the business all without the user ever having to leave the player.

The foregoing has several advantages over the prior art. Use of the player and platform described herein delivers high user engagement; drives brand awareness (without distasteful brand pushes, instead, a viewer calls for information relevant to them and is never pushed or triggered to view—or decline—information that may or may not be relevant) and thus, brand loyalty; enhances multi-channel campaign efforts (a particular brand of peanut butter, co-marketing with a particular brand of jelly, with the video participant/actors clearly enjoying the particular combination within the context of the video, not a separate advertisement, and when interest is garnered within the viewer, the viewer capable of providing in response to a viewer trigger, the 'tell me more' and 'where and how can I buy it' instant ordering functionality. Viewers will share videos they like with friends who are also more likely to have similar tastes and want what their friends got and this encourages sharing of branded content. This will greater enhance brand building, customer acquisition and brand loyalty.

As a result, certain advertisement enhancements are developed. This solution will deliver relevant content and product recommendations based on an individual's preferences, social groups, browsing/buying patterns, favorites and browsing history. It will connect shoppers with brands that drive sales through a curated content experience while boosting engagement and lift conversion rates significantly.

It will create new revenue streams by providing transactions from the advertising revenue. Any or all objects, products and services will be tagging capable and hence are potential cue objects shoppable for a rich interactive experience, but none will trigger a 'pushed' cue point pop-up trigger to distract viewers. Viewers essentially will not even realize they are being solicited, but only when a viewer is interested in an item, will be capable of instantly reviewing further information about that product or service up to instantly ordering it. Because viewing and ordering will be in real time, advanced analytics will provide unique reporting capabilities that gives a clear visibility on user activities, behaviors, and interactions, geographically enabled, which in turn will drive conversion rates. During live-event video viewing, users can be targeted based on in-session behaviors across overall engagement with video content and products.

The player of the current system and method is agnostic and can be a stand alone unit seen as a branded player on sponsorship or landing pages. The user will be subtly encouraged to interact with the cue objects that appear on products available to view and purchase. Alternatively, in another embodiment, the player may be treated as a Super Rich Media ad unit that can play video in traditional or larger size when user-initiated and would be ad supported. In yet another embodiment, the player can appear as an overlay above existing video players, which would be most effective for television networks and online streaming service companies. In any embodiment, the player does not require any special developed app or platform and is a cross-platform player.

The IOD experience enables flexibility for users to watch video and shop without disrupting their video viewing experience and they interact on their own will and only on their own will. They never have to leave the confines of the viewer to shop and/or buy and no ad server need be engaged to provide requested information. In fact, in one embodiment, at a viewer's option, they can turn on and off at will, all cue objects, all hotspots and they can view all such cue objects or hotspots available to them in a single glance. In one embodiment, there can be a 'wishlist' saving certain cue object hotspots to come back to later for more information or to send to someone else who may have interest. Or, alternatively or additionally, they can be bookmarked to watch again later, either by returning to the video or within the player but independent of the particular video from which they came. All transactions are capable of happening and being completed within the player. A user may seamlessly switch between video feeds and go back and forth at will. In one embodiment, products, video clips, entire videos, and the like may be shared with others through social engagement.

In one embodiment, a separate entity, either an entity associated with the provider of platform player, or some other existing or specially created entity, acts a single source purveyor of any good or service offered for sale through the system and method of the present disclosure. That separate entity then engages with various other purveyors of goods and services to procure the desired items and to have them provided directly to the consumer, the consumer having already been billed and charged by the separate entity. From a consumer's point of view, they will be doing business solely with the separate entity, having paid the separate entity, returning any product or service to the separate entity, receiving any applicable refund directly through the separate entity. As to the consumer, they will only have done business with the separate entity and need only one log in, one payment, one identity with the separate entity. In turn, the separate entity, for any good or service available for sale or purchase through the system and method as disclosed, will have pre-arranged with any number of various other purveyors of goods and services the availability of and terms for such other goods and services and obtained pre-approval for the sale and purchase of such goods and services at pre-designated prices and terms. The separate entity then would pass through to the consumer desiring such good or service the exact same price and terms as if the consumer were dealing directly with such other purveyor in real time (and/or potentially adding on any additional fee for service). This obviates the need to set up any number of direct links between consumer and such number of other purveyors. Once the link between the separate entity and purveyor is enabled, and the link between consumer and separate entity is enabled, the link between consumer and other purveyor is instantly enabled. In one embodiment, the separate entity may set its own prices and additional terms for the purchase and sale of items. In one embodiment, the consumer may transact with the separate entity, but if there are any returns or other issues with the purveyor, they may agree to deal directly with the purveyor to resolve those after transaction issues.

None of the foregoing references, or other known prior art, alone or in combination, teach the salient and proprietary features of the present disclosure as just described. While there are many 'new technology' video and media players, and seeming even to purport to enable interactive video viewing experiences, none are truly user initiated, without any trigger 'push' and where advertisement viewing and product and service review and purchase is enable completely within the player. Additionally, in one embodiment, the viewer and system of the current disclosure offers additional functionalities such as viewing angle choice.

SUMMARY

The present disclosure teaches a media player configured to provide an interactive on demand viewing experience comprising a proprietary graphical user interface enabled to allow users to interact with preprogrammed features within a video program comprising cue objects comprising application programming interfaces from relevant ecommerce partners, search query data, and machine learning algorithms. In one embodiment, upon starting a video program, a proprietary menu bar appears enabled to provide the user all of the typical video controls along with an additional functionality comprising a search and shopping cart function that are configured to interact, at a user's request at any point within the viewing of the video, with said cue objects and provide the user additional interactive options. In one embodiment, the system and method may be initiated by simply directly clicking on a cue object when visible.

In one embodiment, the system and method is further configured to allow a user to interact with technical viewing aspects of the video experience such as view angles, specific viewing content and the like.

DETAILED DESCRIPTION

Figure 1:
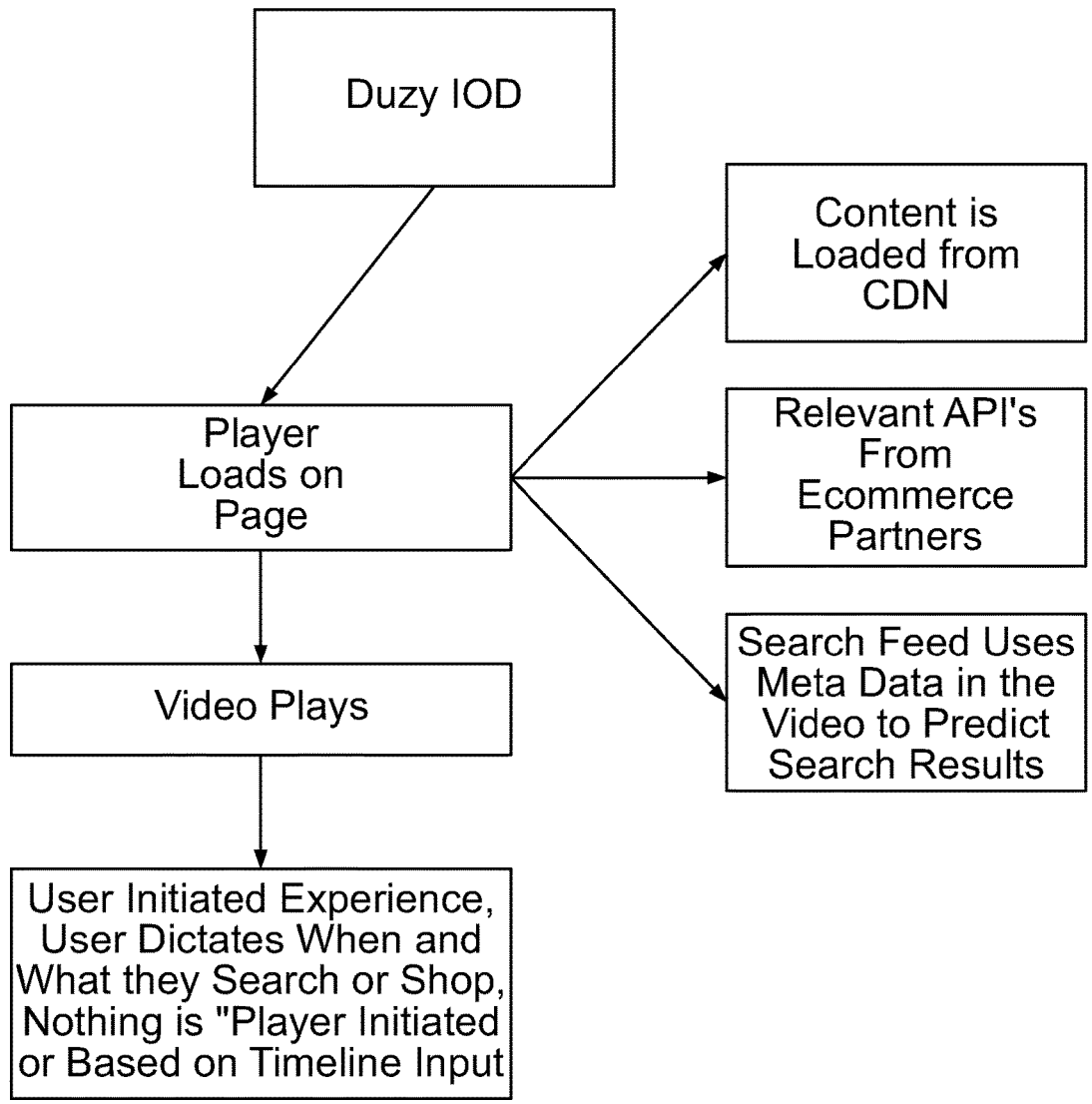
FIG. 1 depicts one embodiment of the flow of the current disclosure wherein the player of the current system is initiated, content that has been specially prepared is loaded, relevant APIs from e-commerce partners are loaded, and a proprietary search feed is enabled, the video then begins playing and awaits instructions from the viewer to initiate commands. The user dictates when and what they search or shop and nothing is player initiated based on a timeline overlay. All actions and interaction happens within the player—there are no calls to pull information from ad servers or from e-commerce partners—that has already been fully enabled within the player.
Figure 2:
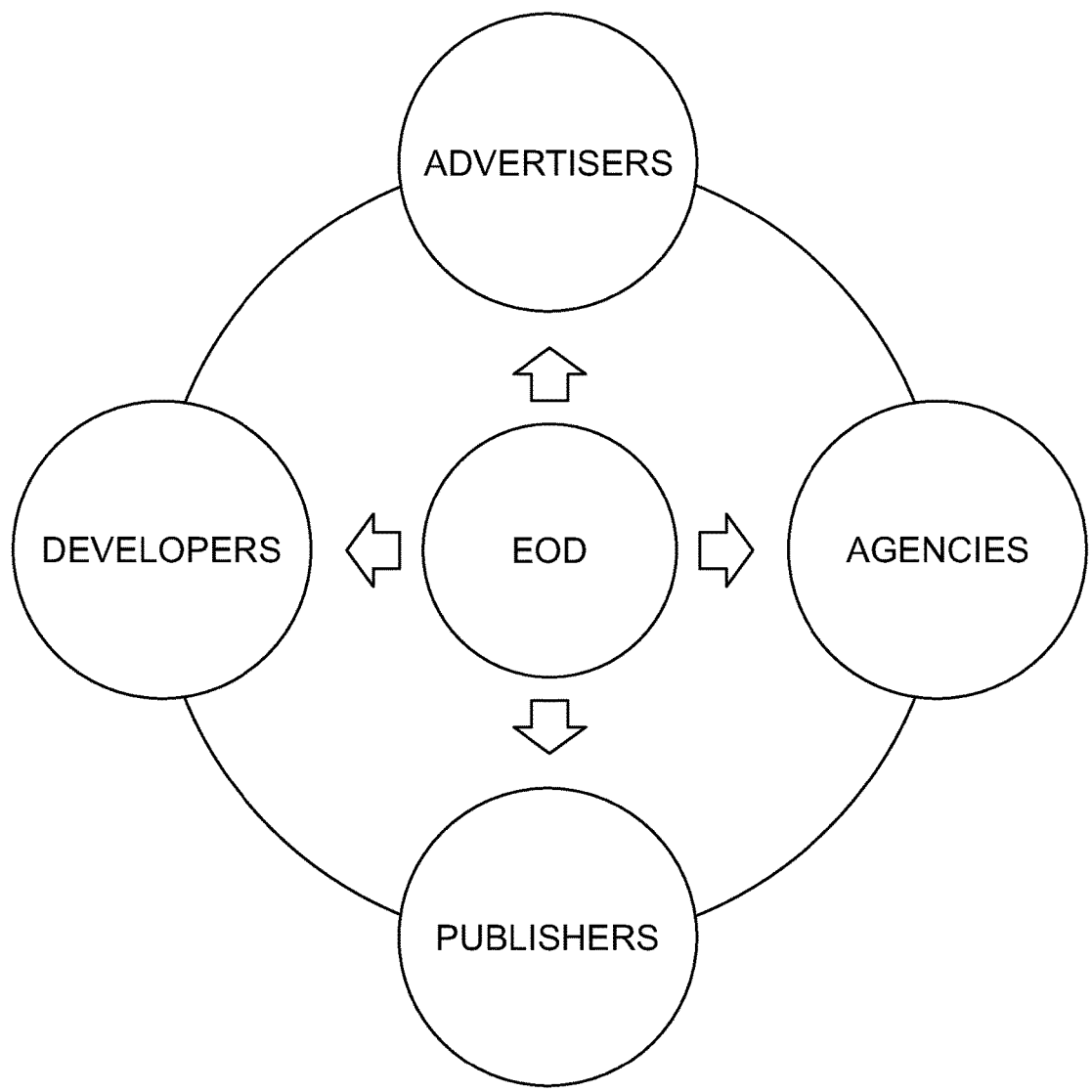
FIG. 2 depicts an embodiment of the player and system as disclosed noting uses with partners such as developers, advertisers, agencies and publishers.

For clarity of disclosure, and not by way of limitation, the detailed description of the invention is divided into the following subsections that describe or illustrate certain features, embodiments or applications of the present invention.

Definitions

"IOD" as used herein means interactive on demand and is used to describe a user initiated experience that is configured to allow a user the ability to select when and how to interact with preprogrammed features within a video independent of where along a timeline a particular viewing is.

"GUI" as used herein means graphical user interface and is used to describe the graphical overlay of icons and clickable features a user of a video player has available to them to control and/or interact with the viewing experience.

"API" as used herein means an application programming interface and is used to describe a set of subroutine functionality definitions, protocols and tools utilized in programming videos for use with the video player as described herein across platforms and incorporating communication from outside software platforms.

"Cue object" as used herein refers to any element within a video program that is pre-configured to be an element that a viewer of the video can interact with at their will by either directly clicking it or clicking through a proprietary viewer menu to obtain more information and may be able to purchase directly through the viewer.

"Payment handler" as used herein refers to a component module of the disclosed technology wherein a single source payment entity with a single login to the user is enabled who then has prearranged accounts with any number of purveyors/fulfillment centers to have cue objects direct shipped to any designated user, such payment handler merely acting as a temporary custodian of funds to facilitate ease of transaction.

"Purveyor" or "Fulfillment center" as used herein may be used interchangeably and refers to any source of cue objects who provide shipment of such cue object to designated users in exchange for a preset fee, such fee being transferred by the payment handler in exchange for cue object being directly sent to a designated user and such purveyor and/or fulfillment center then remaining responsible for any downstream transaction incidents.

The System and Method of the Present Invention

In one embodiment, the system and method of the present disclosure teaches a proprietary video player that is enabled to play any typical known video stream program. In a preferred embodiment, the video stream is pre-configured to contain one or more cue objects with which a viewer of the video utilizing the video player of the current disclosure may interact when and how they choose.

In one embodiment, a cue object is directly clickable upon seeing the cue object at any point within the viewing of the video. For example, an actor appearing within a video may be wearing a particular pair of sunglasses. If those sunglasses are a cue object, at any point in the video where the sunglasses appear on the screen, a viewer may click on them which will initiate an interactive experience allowing the viewer to obtain more information about the sunglasses, including the ability to purchase them. In an alternative embodiment, the user of the video player will have access to a proprietary cue object menu and may be able to obtain the information and purchase functionality from such proprietary menu bar enabled within the video player, at any time, whether or not the cue object is currently 'on-screen'. In an alternative embodiment, cue objects viewable within the proprietary menu bar may be only those currently 'on-screen.' In an alternative embodiment, there may be a proprietary menu bar toggle switch in which the user can dictate which cue objects are viewable at any given point.

In one embodiment, the system and method as disclosed herein provides users the ability to interact with cue objects at their will rather than being bombarded with cue point triggers along a timeline prompting a user to make choices. In this embodiment, the viewer has complete discretion when and how or even if, to interact with the video. This is akin to a 'pull' of information rather than a 'push', a system that pushes you to interact at certain trigger points along the way.

In one embodiment, the system and method of the current disclosure provides the user alternative interactive viewing experiences such as to change the viewing angle—instead of viewing the current scene from the front, a user may be able to choose to view the scene from the side, or the back, or from overhead. This feature is described more thoroughly below in the examples section.

In one embodiment, a viewer may have to login to the video player to enable all functionality, such as the ability to purchase cue objects in a single click. In one embodiment, there may be a pre-arrangement with a fulfillment center such as Amazon® that is able to fulfill orders. A user logs in to their player account, which is pre-linked to their Amazon® account (or any other one or more such e-commerce partners) and when the user interacts with a cue object and desires to purchase, they are enable to purchase directly within the viewer without ever having to leave the viewing experience to go to the other e-commerce site. The transaction criteria are already pre-configured within the video player. In an alternative embodiment, the user only needs to have an account associated with the login to the viewer and does not need to have an account with any fulfillment center. In this embodiment, the payment handler has an account with the fulfillment center and processes any order through its own account, directing delivery to the user.

In one embodiment, the viewer, upon logging into the video player will enable the ability to purchase cue objects from any number of purveyors or fulfillment centers with a single click. In this embodiment, the viewer is actually logging in with a separate entity, or a payment handler, than any single such purveyor or fulfillment center. In turn, the separate entity, or payment handler, has pre-arranged with any number of other purveyors and/or fulfillment centers for the direct provision of goods and services at the payment handler's direction on pre-determined prices and terms. The payment handler conducts business with the user directly according to the prices and terms as set by the pre-determined prices and terms of any number of other purveyors and/or fulfillment centers and passes same along directly to the viewer, charging the viewer and then transferring to the purveyor or fulfillment center, the purveyor and/or fulfillment center then directly shipping to the user. In this manner, there does not need to be a separately enabled link between user and other purveyor and/or fulfillment center, only one with the payment handler that acts as a global link.

In one embodiment, the viewer technology will have geo-location enablement, where, with user approval (based on preferences set by the user, or there could be default preferences that the user could opt out of), the viewer technology will be enabled to have the location of the viewing taking place enabling a fulfillment center located within a predefined zone or distance from the viewing to fulfill a user request for a purchase of a cue object to be fulfilled within a predefined time in real time. For example, in this embodiment, a cue object might be a pizza of no particular brand within the video playing. It may be as simple as persons within the video eating a pizza, not advertising it, per se. However, upon the user engaging with the cue object pizza, and finding it to be a cue object—'hey, I'm hungry, I could go for a pizza'—that engagement with the pizza cue object enables a particular brand of pizza purveyor to obtain the geo-location information from the viewing technology, ascertain that that purveyor has a location open and able to deliver a pizza within a predefined time to that location, and then, in real time, offer the user the ability to purchase and have delivered, a pizza. The advertisement is the enabled ability to purchase. There is no need to actively convince the user to buy. In fact, this 'surprise' cue object, will become fun for the user to find. It will become somewhat of a mystery of touching all over the screen, or continuously reviewing the proprietary cue object menu bar, to find cue objects and almost become a disappointment when a desired object is not enabled as a cue object (spurring advertisers to desire to have their products and services enabled as cue objects). The geo-location embodiment just described will enable almost instantaneous gratification.

In one embodiment, the viewer technology will comprise a lead generation module. In this embodiment, any product or service that is enabled as a cue object, where the user demonstrates any interest—for example, touches it to see if it is a cue object (or opens the proprietary cue object menu bar)—the viewing technology will be enabled to passively (behind the scenes and without the viewer having to stop to affirmatively fill anything out) collect the user data from the user login and forward contact information to the purveyor of the good or service to follow up about that good or service. The good or service may be fictitious or generic in the video, but may be of a type that is desired by the user. For example, there may be a law firm in the video—a made up one for the purposes of the video. But, the user, in need of real legal services may investigate it as a cue object. The viewer technology then will collect the information of that user investigating legal services as a cue object and forward the lead information to pre-enabled legal services providers who may be able to provide the assistance the user was investigating. In certain embodiments, this module could be combined with the geo-location feature described above to provide lead information to relevant purveyors where the good or service provided is naturally local in nature.

In one embodiment, the player will allow seamless switching between video feeds with all cue objects enabled in each and every feed. For example, in this embodiment, a user could be viewing an auto race and wants to follow a certain driver. They could be enabled to watch and follow that particular driver that has a camera feed on that car throughout the race. Cue objects could be products and services displayed by advertisers emblazoned on the car. The user could at some point decide to see the status of a different driver and switch feeds and through a menu command, can accomplish that and all cue objects will still remain enabled through all feeds.

In one embodiment, a viewer may have the option to dismiss a cue object. For example, the viewer has no interest in obtaining further information about a specific cue object, they can dismiss it and no longer be provided the option with that particular cue object, thus, clearing some clutter from their menu where there are many enabled cue objects. In this embodiment, the user may have the option to restore all cue objects and re-obtain the ability to interact with previously dismissed cue objects.

In one embodiment, the viewer of the current disclosure is cross-platform enabled. No special applications or plugins are required and the functionality is enabled through a proprietary overlay such that the viewing experience can be enabled on the open web and within other applications. Thus, whether a user is engaging social media, such as Facebook®, or surfing the Internet using any common web browser such as Chrome®, a user can be offered the opportunity to click a video and play utilizing the branded video player as described herein and the video will load with all of the pre-programmed functionality as described herein. In one embodiment, users may be offered the ability to login to their video player account, further enabling additional functionality, such as one click ordering without having to access any outside e-commerce partners.

In one embodiment, users may share their particular video find with others by directly emailing or texting a link to the particular video or sharing across social engagement platforms.

In one embodiment, there is seamless viewing experience across platforms. Thus, a viewer viewing a particular media feed within the Facebook® platform will have substantially the same viewing experience and substantially the same interactive ability as a viewer viewing the same feed on the open web or within an alternative application.

In one embodiment, the video player described herein can be utilized to view pre-recorded content, such as video clips to full length movies or television programs. In an alternative embodiment, the video player described herein can be utilized to view live events.

Figure 3:
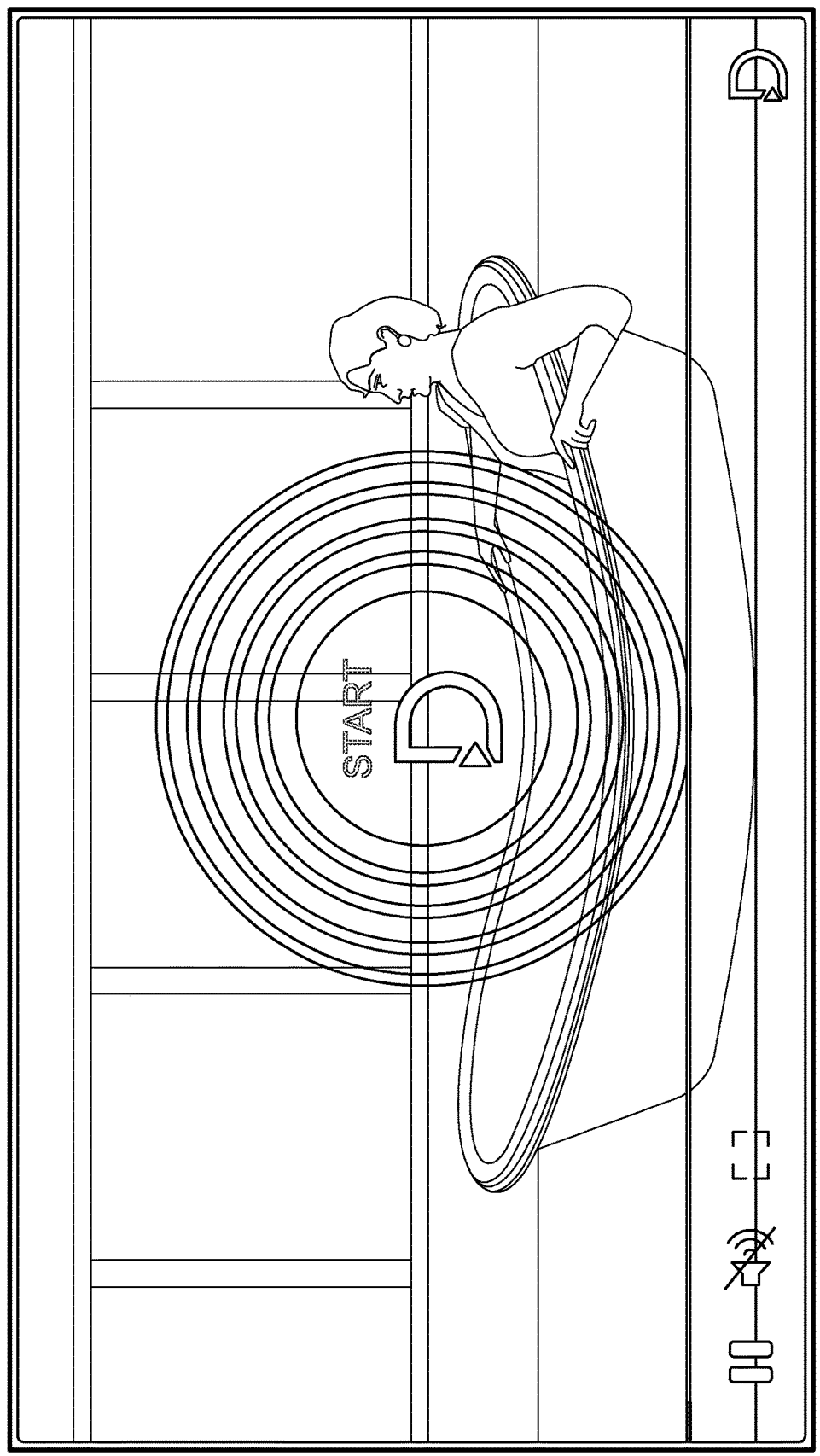
FIG. 3 depicts one embodiment of the player of the current disclosure depicting a representative screenshot of a video fully enabled for use in the player and system loaded and ready to begin play. In this embodiment, besides the video itself, there is a player menu at the bottom of the screen for controlling playback and volume and the exclusive and proprietary menu button.

Referring to FIG. 3 through 7, an embodiment of one particular sequence of events is displayed through a series of screenshots. It is important to note that everything displayed happens within the video player environment. In FIG. 3, an opening screenshot is displayed showing the launch of the player and an icon displayed to start the immersive experience.

Figure 4:
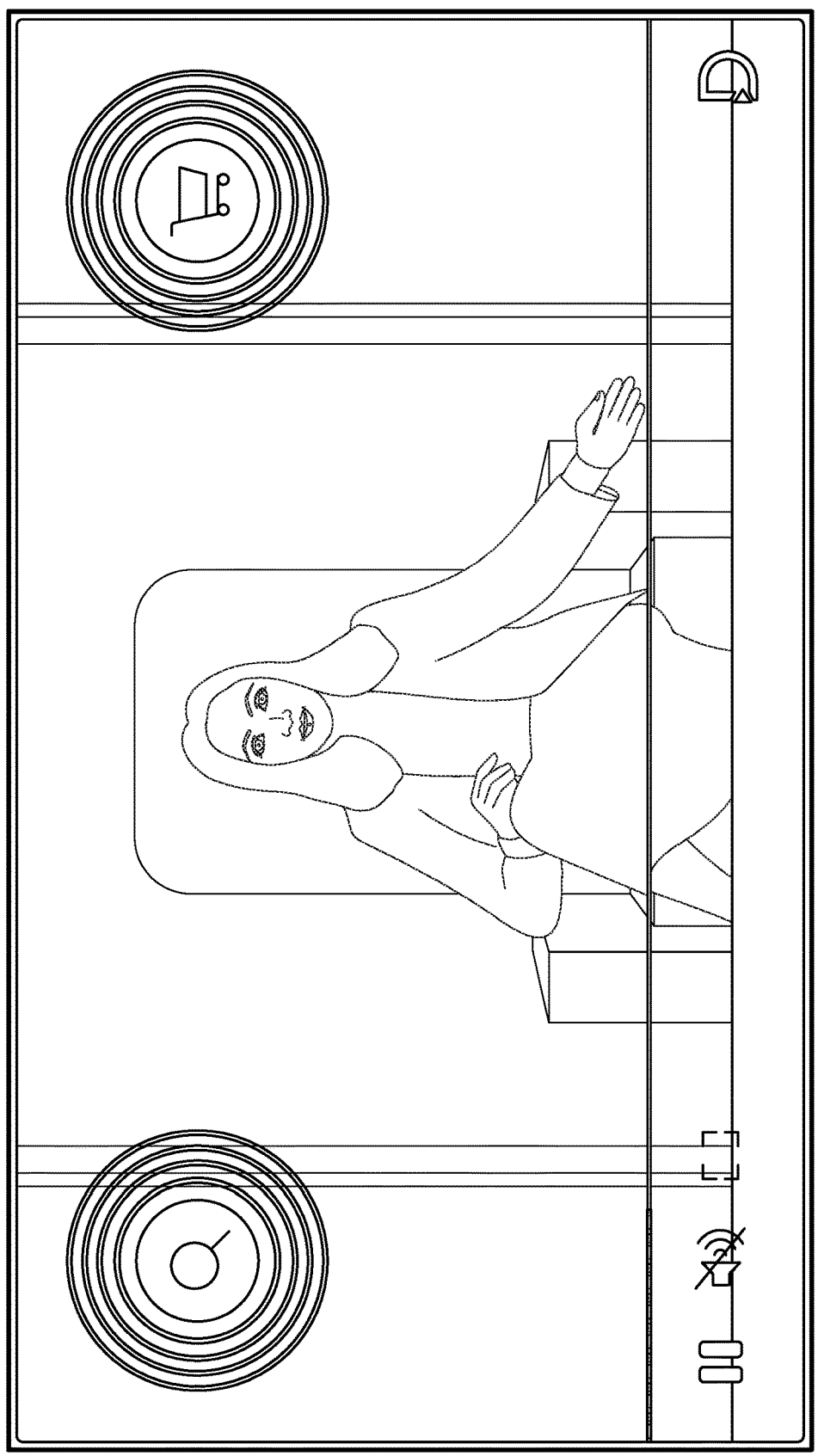
FIG. 4 depicts one embodiment of the player of the current disclosure depicting a representative screenshot of a video fully enabled for use in the player and system loaded and having begun play. In this embodiment, besides the video itself, there is a player menu at the bottom of the screen for controlling playback and volume and the exclusive and proprietary menu button, which, having been clicked, initiates the search and shopping cart icons within the viewing screen and the video still visible.

In FIG. 4, the image displays an embodiment where the user has initiated a proprietary menu where a search icon and a shopping cart icon are displayed enabling the user to interact with any enabled cue object, searching for cue objects or purchasing products associated with a cue object.

Figure 5:
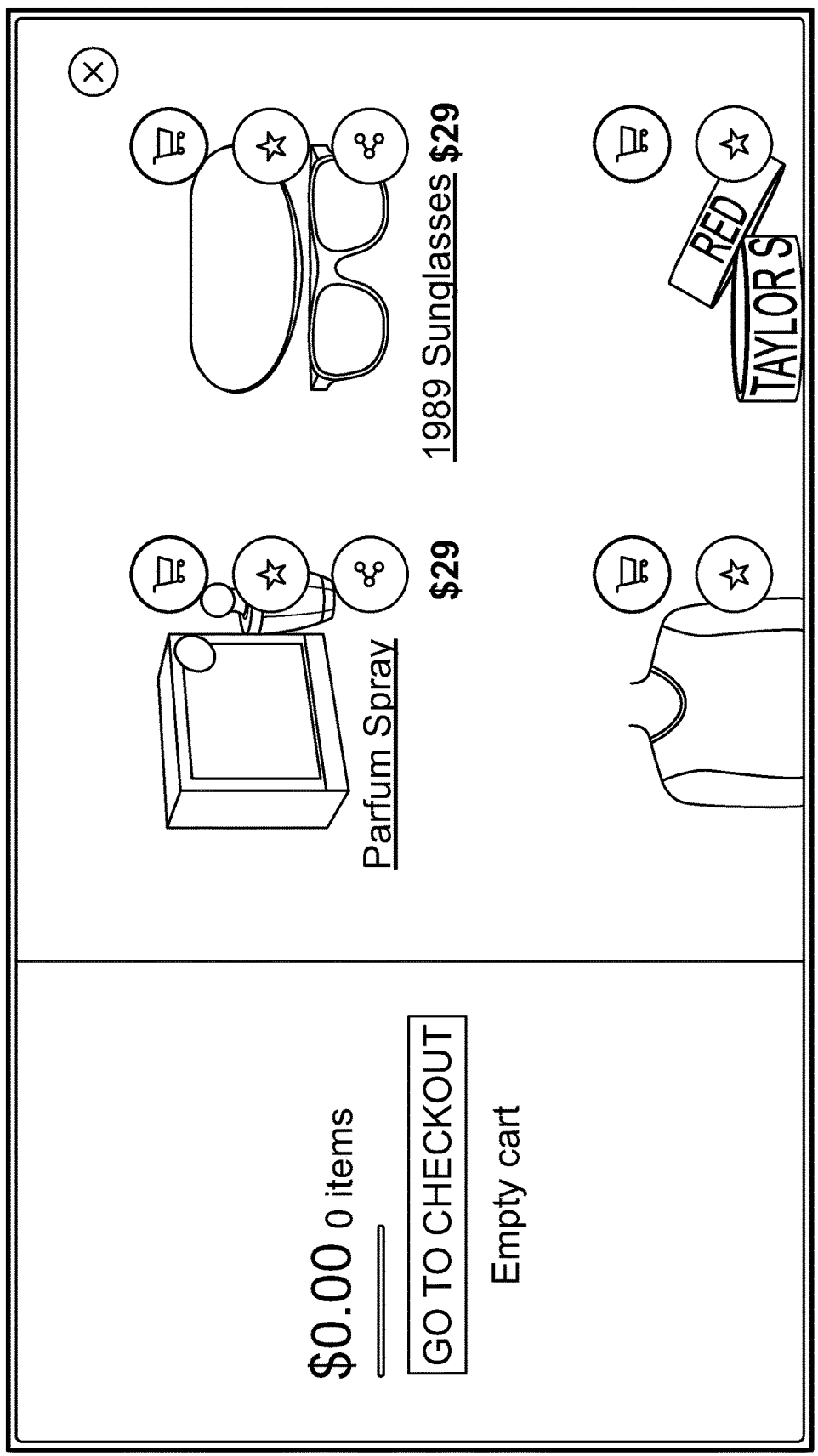
FIG. 5 depicts one embodiment of the player of the current disclosure depicting a representative screenshot of a video fully enabled for use in the player and system loaded and having begun play and the search function having been initiated. In this embodiment, within the video player itself, information about certain enabled cue objects is displayed with enabled icons for obtaining further information, purchasing, and a view of the shopping cart. At any time, the viewer may instantly return to viewing the video as all of this is happening within the video player.

In FIG. 5, the image displayed is the result of one embodiment where the shopping cart icon was pressed and the ability to purchase certain items associated with cue objects is displayed.

Figure 6:
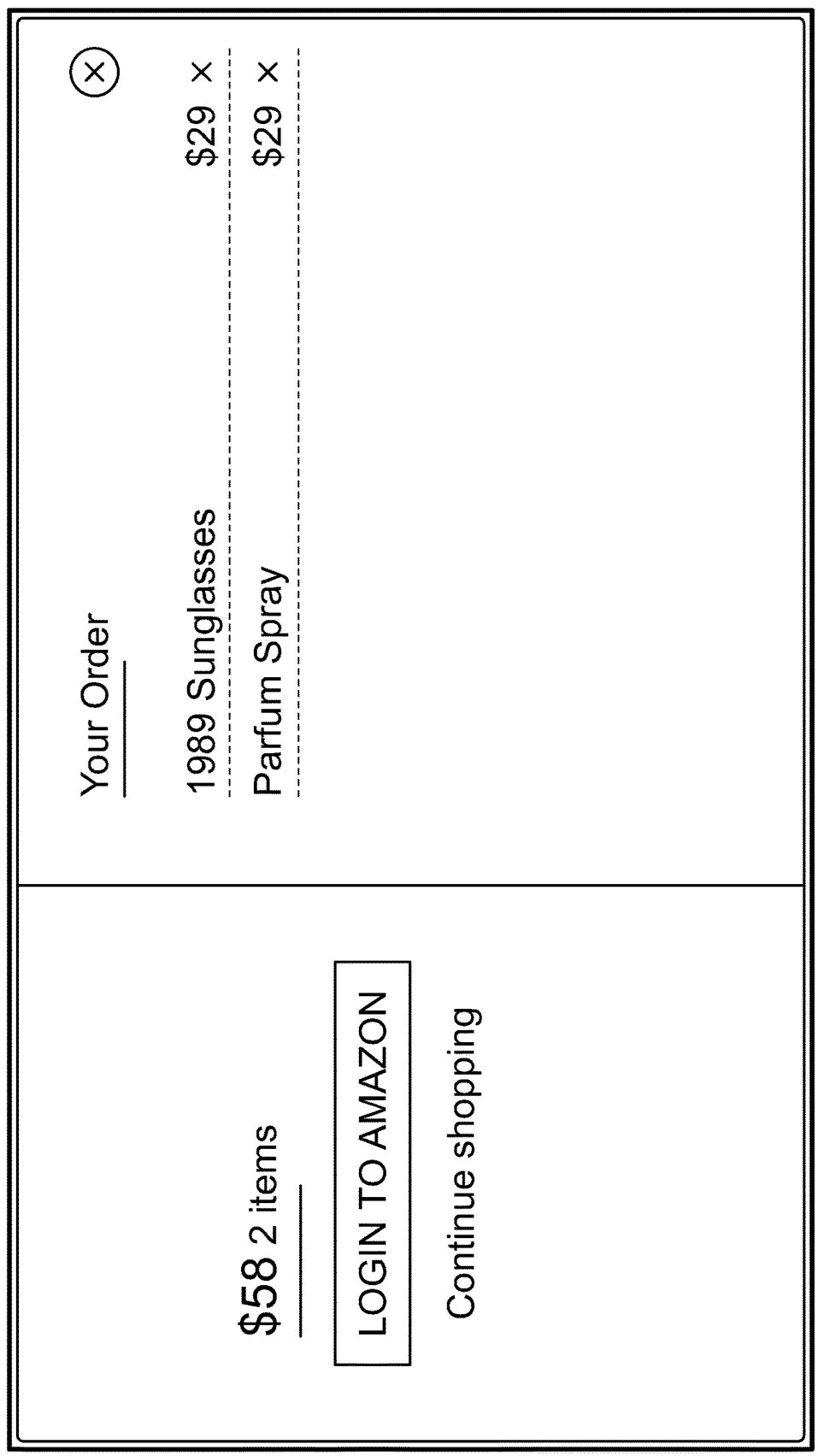
FIG. 6 depicts one embodiment of the player of the current disclosure depicting a representative screenshot of a video fully enabled for use in the player and system loaded and having begun play and a shopping function order having been initiated. In this embodiment, within the video player itself, the shopping cart displays the current status of a pending order. At any time, the viewer may instantly return the video as all of this is happening within the video player.

In FIG. 6, the image displayed is the result of one embodiment where certain items were selected for purchase. In this particular screenshot, the user is offered the ability to provide, within the confines of the player, their login to Amazon® to complete the purchase. In an alternative embodiment, by logging into the player and having already created the association to an Amazon® (or other e-commerce partner), this login screen can be bypassed.

Figure 7:
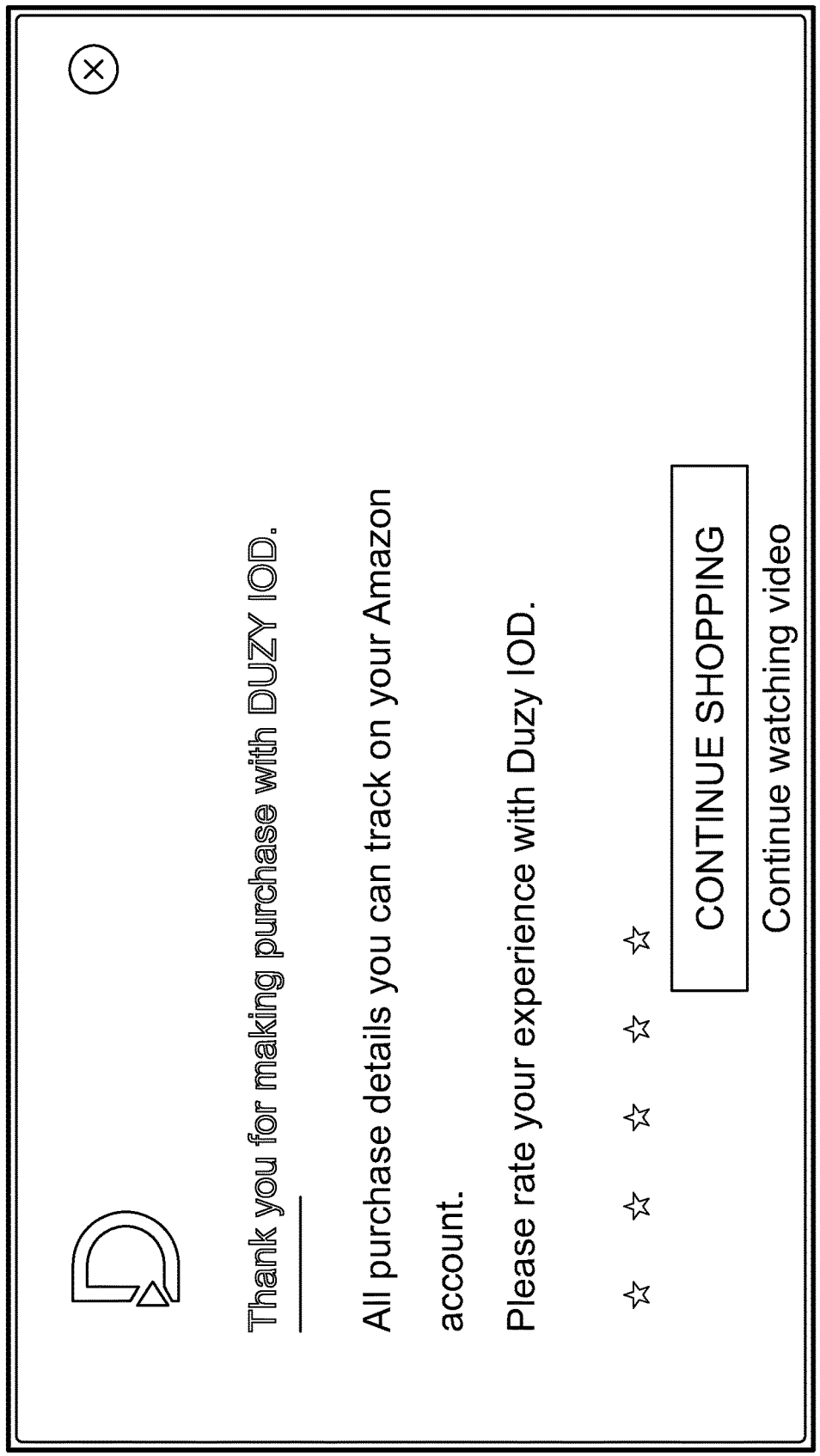
FIG. 7 depicts one embodiment of the player of the current disclosure depicting a representative screenshot of a video fully enabled for use in the player and system loaded and having begun play and a shopping order having been purchased. In this embodiment, the viewer may continue to more shopping, or return instantly to the video as all of this is happening within the video player.

In FIG. 7, in this image, an embodiment is depicted wherein a purchase has been completed and you may continue with shopping or return to the video, without ever having left the confines of the video player.

Figure 8:
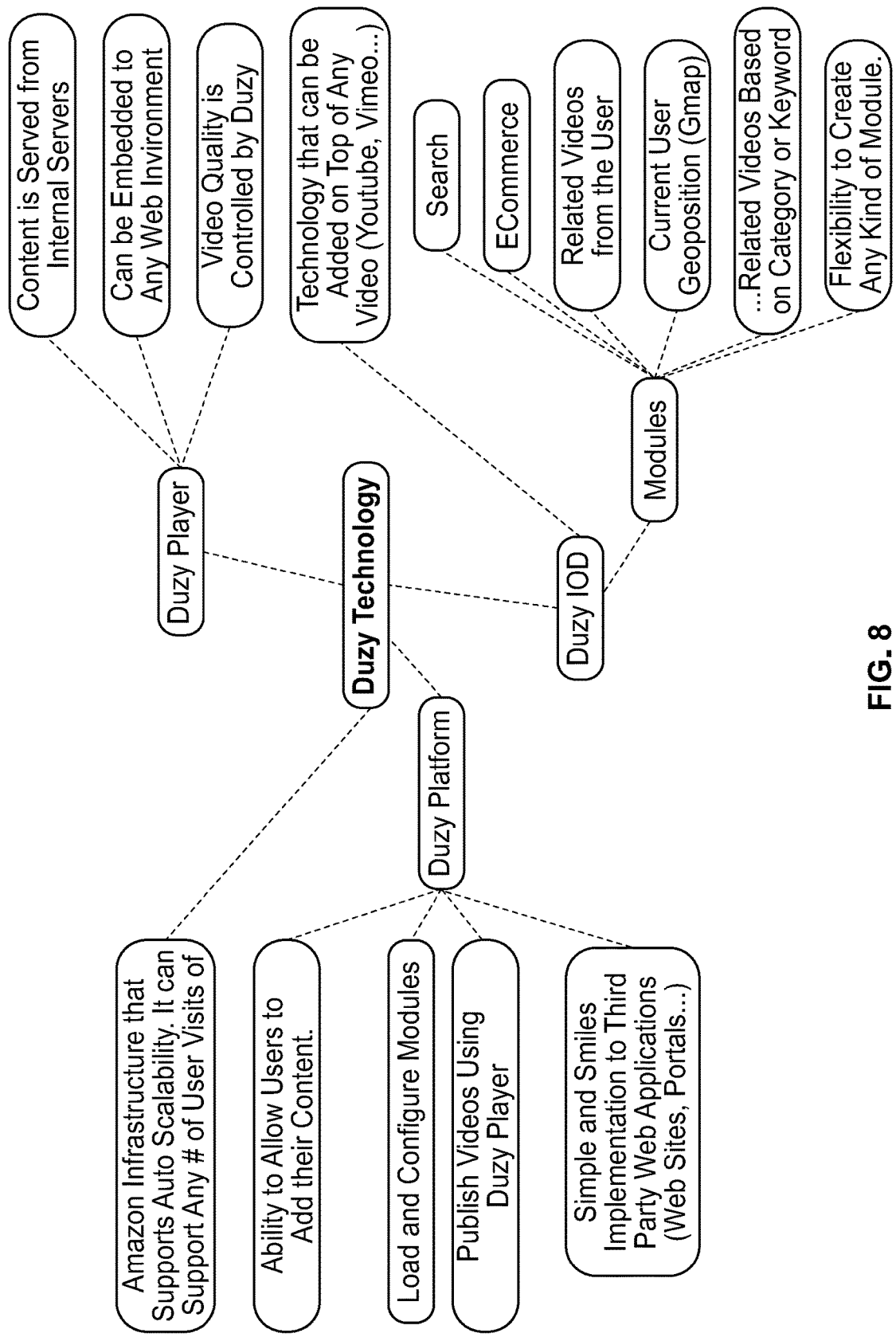
FIG. 8 depicts a flowchart of one embodiment of the proprietary (Duzy) technology of the current disclosure and the relationship and interplay between the proprietary (Duzy) player, the various layers and modules that can be layered into any media stream for playback with the proprietary player for a proprietary (Duzy) interactive on demand experience, and the overall proprietary (Duzy) platform and e-commerce infrastructure that can be incorporated. The name "Duzy" merely reflects a potential brand to distinguish the proprietary nature of each of the elements.

Referring to FIG. 8, in one embodiment, the system and method of the current disclosure is enabled be separate proprietary pieces of technology that power the overall commercial experience. First, there is a platform that powers the creation of interactive modules. This platform enables customers (the publishers, media owners and/or content producers, advertisers) to seamlessly upload any enabled number of products, services or cue objects or other content into an editing platform. The platform then enables such customer the ability to add their monetization module links within the system. For example, a customer can add within the platform their API key for Amazon®, Shopify®, other e-commerce platform or even their own proprietary commerce platform API (and thus, enabling analytics within the customer experience). Second, there is a player that enables content integration and API connections that provide functionality within the player. This player is deployed via code onto the media partners' platform (which could be a separate website or mobile application or other media providing stream). Once deployed, the player has a proprietary ability to inject modules into the content enabling customers to search, explore local services and businesses, or purchase right within the player based upon pre-programmed cue objects. The end viewer dictates his or her own overall viewing experience (which may be completely different than another end viewer viewing the exact same stream). It is the end viewer's 'pull' and not the player's 'push' that dictates how the viewing stream unfolds. The overall technology serves as the hub for content, commerce integrations and analytics. The customer preparing their proprietary media stream for the end viewer can set up all playlist and sequencing within the player. All search revenues, click through data, lead generation data, commerce data and any other data can be extracted, analyzed and housed within the platform. This technology can be deployed as a stand alone platform or layered on top of any other existing video player and/or content player (such as YouTube®, Vimeo® and the like).

Figure 9:
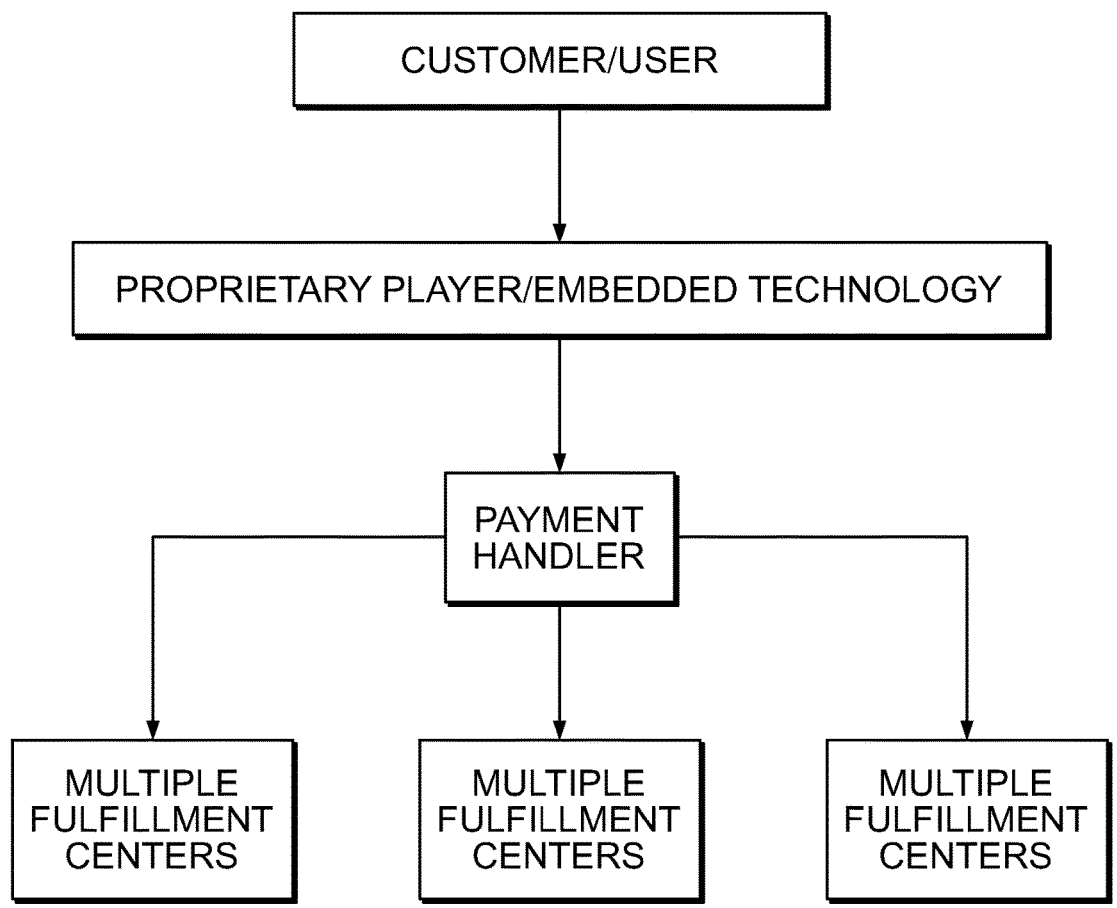
FIG. 9 depicts one embodiment of the technology described herein where one component of the proprietary player comprises a payment handler module wherein such payment handler represents a single source payment and fulfillment platform such that the user of the technology, without leaving the video player itself and redirected to any alternate buying or fulfillment source, can purchase any enabled item within the video from a single source, although the items may ultimately come from any number of fulfillment centers.

Referring to FIG. 9, and as described in some detail herein, in one embodiment, one module of the proprietary technology comprises a solitary payment handler, configured to have one login and prearranged to be able to accept a user payment and complete a transaction with a plurality of fulfillment centers without the user having to have an account with any single of the plurality of fulfillment centers. In an alternative embodiment, upon a user logging in to the proprietary technology as described, the payment handler is configured to query whether the user has a specific account with any of the plurality of fulfillment centers and identifies the user to such fulfillment center, if so. In any case, the user experience is seamless within the technology and there is no need for the user to exit the player to either purchase any cue object, get any other information about any cue object, or otherwise interact with a cue object or the player.

Figure 10:
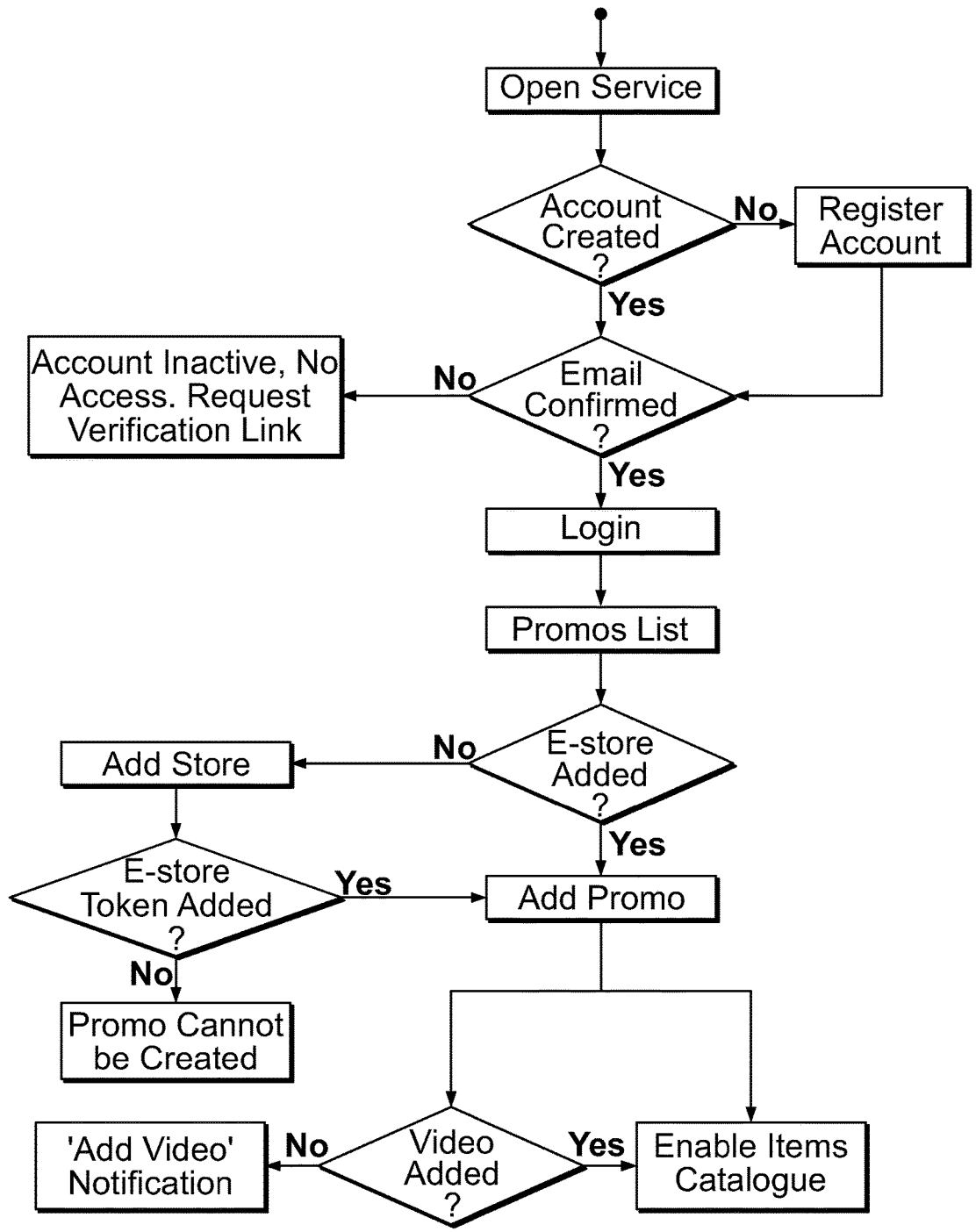
FIG. 10 depicts a flowchart of one embodiment of how a provider of a media stream for playback using the technology described creates and enables such media stream for a playback user to encounter.
Figure 11:
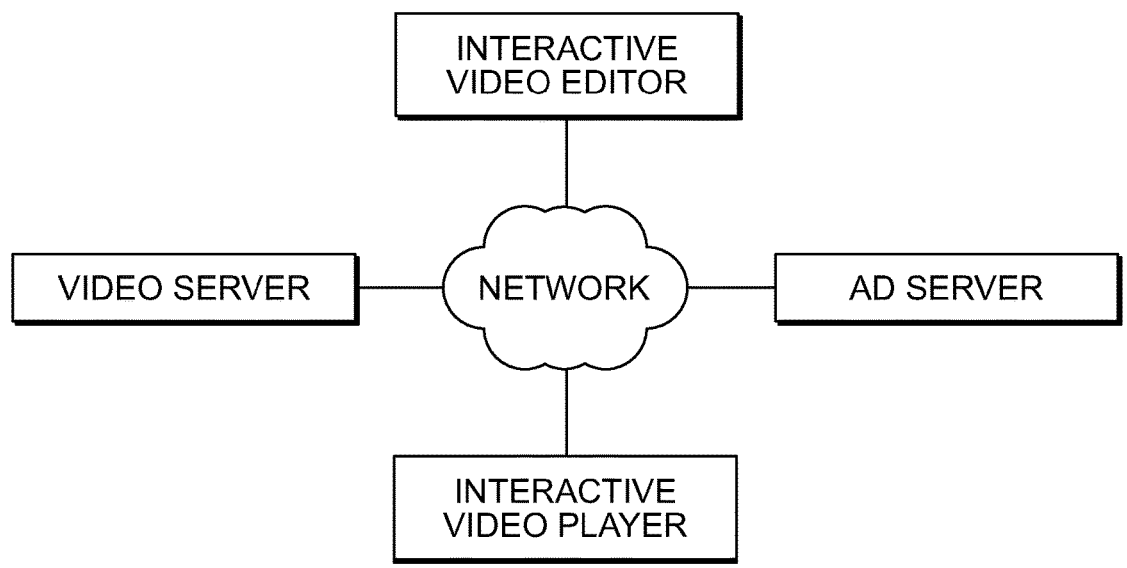
FIG. 11 depicts prior art where the video player, through a network connection, is also connected to a video server, an ad server and an interactive video editor.
Figure 12:
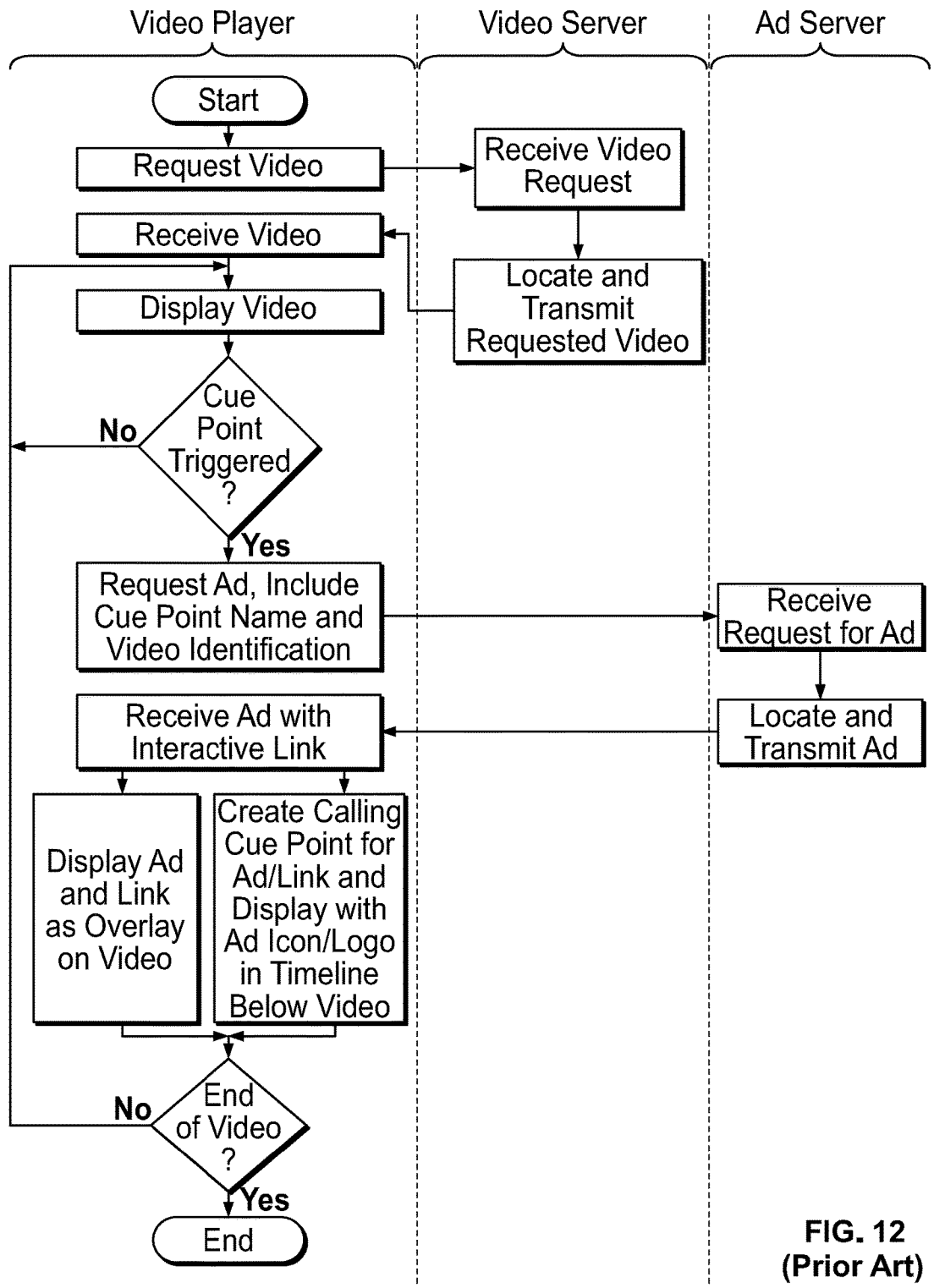
FIG. 12 depicts prior art where a video player receives a video request that is then loaded from a video server and begins play. Along a certain timeline overlay, once a cue point along that timeline is triggered, a request to an ad server is triggered and the user is bombarded with the choice of viewing the ad with interactive links to outside websites for information about the product or service and links to outside websites for the ability to purchase. At several points, the flow happens outside the confines of the video player and the interaction is affirmatively made a choice for the viewer, and not simply an option without affirmative pressure and interruption to make a choice.

Referring to FIG. 10, depicted is one embodiment of a flow of how content can be created and enabled for viewing utilizing the technology described and enabling cue objects for interaction with playback users of the technology.

EXAMPLES

The present invention is further illustrated, but not limited by, the following examples.

In one embodiment, the player of this disclosure is utilized to view pre-recorded events such as video clips or movies, and the like. In this embodiment, advertisers may choose to engage with the video producers to have certain of their products or services enabled as cue objects within the video stream. In this embodiment, the video media is pre-programmed to enable such cue objects. For example, the video may concern a golf instruction within which a golf instructor will demonstrate a certain new club or golf ball and the proper way to swing using such club. A viewer may be particularly interested in the club, or golf balls, or golf glove, or hat or shirt, etc. that are viewable within the video. Any one or more of these objects can be enabled as a cue object and whenever the viewer sees those objects on the view screen, if pre-configured to be a cue object, they can simply click on the object to obtain further information and/or actually directly purchase the object.

In this embodiment, it becomes a fun experience for the viewer. They are already watching a video they are interested in. Now, the viewing experience is enhanced with greater viewing controls and options. In one embodiment, perhaps various viewing angles are enabled. Thus, a viewer could watch the video from the side to get one view of the instruction of the proper swing path for the club. The viewer could then change the view angle to watch from the front, or behind, or overhead and see the same swing from various angles. At any point, upon becoming interested in any of the products or services on display within the video, the viewer can also interact with any enabled cue object to obtain further information and/or purchase.

In an alternative example, the video player could be exceptionally desirable to view concerts, either live or pre-recorded. In this example and embodiment, the viewer may be able to choose to view the entire band on stage, or choose an alternative view to a close-up of one particular band member. This may be particularly desirable for a viewer desiring to see a lead solo or having a particular interest in the drummer, for example. Each viewer may have their own unique viewing experience. In this example, though, all viewers will have the same ability to interact with enabled cue objects at any point and may, for example, have the ability to purchase the version of the song being played, or t-shirts, or other band songs, or instruments, or any of a plethora of items that could be enabled as cue objects.

In an alternative embodiment, the video player could be exceptionally desirable to view mystery—'who-done-it"— videos where cue objects could be interacted with by viewers to obtain more information as they are relevant to the story line. This would encourage viewers to interact with all cue objects in an effort to 'figure out' the mystery. Along the way, they may also be enticed to purchase products or services offered for sale.

In these embodiments, it is important to note that viewers choose how and when to engage with cue objects. The viewer is enticed to interact and not prompted to interact. One of skill in the art will appreciate the many additional features that could be programmed as interactive engagement on demand features that would further entice viewers to interact with additional elements of the viewing experience and thereby offer additional opportunities for advertisers.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. A video player comprising at least one processing device and a screen controlled by software when executed by the at least one processing device that generates a video stream displayed on said screen and configured to generate a user interface wherein said at least one processing device and software is further configured to enable end viewers to interact with cue objects pre-enabled within said video stream displayed on said screen, said video player further limited wherein:
   said at least one processing device and software is further configured to stream a fully independent video overlay to allow particular images within said video stream displayed on the screen to be chosen and pre-enabled as cue objects for viewer interaction at any point in time while a viewer is viewing the video stream wherein said overlay allows said viewer interaction without video stream disruption; and
   said at least one processing device and software is further configured to display at least one proprietary cue object on the screen that enables an end viewer to choose from interaction options comprising logging in, obtaining information about said at least one cue object, and purchasing said at least one cue object, at any point during video stream play, enabled with an overlay API that comprises an interactive payment handler module configured to collect information, display cue objects, aggregate cue objects for purchase and perform the aggregate purchase transaction by using APIs within the viewing frame overlay on the video player, and same implemented wholly within said video player and overlay, eliminating all direct, real-time linking or transfer of context, frame and/or control of said video player to any third party purveyor site; and
   said at least one processing device and software is further configured to display interactive icons on the screen enabling end viewers to choose from a menu of choices for interaction on demand; and
   said at least one processing device and software is further configured to process any number of content modules configurable by content creators and editors to provide end users customizable interactive options; and
   said at least one processing device and software is further configured to enable said video player to be implemented within existing third party website portals and applications.

2. The video player of claim 1, wherein said at least one processing device and software is further configured to allow end viewers to share media content with others.

3. The video player of claim 1, wherein said video player is configured to function as a stand alone system.

4. The video player of claim 1 wherein said video stream displayed on said screen is generated in real time from a live content feed.

5. A method of advertising the method comprising the steps of:
   developing media content containing at least one cue object enabled for use with a video player comprising at least one processing device and a screen controlled by software when executed by the at least one processing device that generates a video stream displayed on said screen and configured to generate a user interface wherein said at least one processing device and software is further configured to enable end viewers to interact with cue objects pre-enabled within said video stream displayed on said screen, said video player further limited wherein:

said at least one processing device and software is further configured to stream a fully independent video overlay to allow particular images within said video stream displayed on the screen to be chosen and pre-enabled as cue objects for viewer interaction at any point in time while a viewer is viewing the video stream wherein said overlay allows said video interaction without video stream disruption; and said at least one processing device and software is further configured to display at least one proprietary cue object on the screen that enables an end viewer to choose from interaction options comprising logging in, obtaining information about said at least one cue object, and purchasing said at least one cue object, at any point during video stream play, enabled with an overlay API that comprises an interactive payment handler module configured to collect information, display cue objects, aggregate cue objects for purchase and perform the aggregate purchase transaction by using APIs within the viewing frame overlay on the video player, and same implemented wholly within said video player and overlay, eliminating all direct, real-time linking or transfer of context, frame and/or control of said video player to any third party purveyor site; and said at least one processing device and software is further configured to display interactive icons on the screen enabling end viewers to choose from a menu of choices for interaction on demand; and said at least one processing device and software is further configured to process any number of content modules configurable by content creators and editors to provide end users customizable interactive options; and said at least one processing device and software is further configured to enable said video player to be implemented within existing third party website portals and applications;

enabling the at least one cue object to be viewable, clickable, shareable, and purchasable through said video player;

providing access to an end user of said media content and at least one cue object utilizing said video player; and analyzing, tracking and fulfilling all end viewer interactions with any of at least one cue objects interacted with while accessing said media content utilizing said video player.

6. A video player configured as a sales platform comprising at least one processing device and a screen controlled by software when executed by the at least one processing device that generates a video stream displayed on said screen and configured to generate a user interface wherein said at least one processing device and software is further configured to enable end viewers to interact with cue objects pre-enabled within said video stream displayed on said screen available for purchase from any number of purveyors, said video player configured as a sales platform further limited wherein:

said at least one processing device and software is further configured to stream a fully independent video overlay to allow particular images within said video stream displayed on the screen to be chosen and pre-enabled as cue objects for viewer interaction at any point in time while a viewer is viewing the video stream wherein said overlay allows said viewer interaction without video stream disruption; and said at least one processing device and software is further configured to display at least one proprietary cue object on the screen that enables an end viewer to choose from interaction options comprising logging in, obtaining information about said at least one cue object, and purchasing said at least one cue object, at any point during video stream play, enabled with an overlay API that comprises an interactive payment handler module configured to collect information, display cue objects, aggregate cue objects for purchase and perform the aggregate purchase transaction by using APIs within the viewing frame overlay on the video player, and same implemented wholly within said video player and overlay, eliminating all direct, real-time linking or transfer of context, frame and/or control of said video player to any third party purveyor site; and said at least one processing device and software is further configured to process any number of content modules configurable by content creators and editors to provide end users customizable interactive options; and said at least one processing device and software is further configured to enable said video player configured as a sales platform to be implemented within existing third party website portals and applications wherein said video player configured as a sales platform is configured through said overlay API to interact with at least one separate payment handler creating one secure link between any one end viewer and said payment handler, said payment handler additionally configured to engage a plurality of purveyors to offer preconfigured cue objects of each of said plurality of purveyors directly to any one end viewer.

7. The video player configured as a sales platform of claim 6 further comprising a geo-location module wherein said player is configured to recognize, store and track the location from which any viewing of any content displayed by said video player.

8. The video player configured as a sales platform of claim 7 further comprising software configured to enable any purveyor local to the location from which any viewing of any content displayed and recognized by said video player to offer said user of said video player particular goods and services for immediate delivery through said payment handler.

9. The video player configured as a sales platform of claim 6 further comprising a lead generation module wherein said player is configured to collect, store and track relevant information of a user of said video player in connection with said user interacting with specific cue objects.

* * * * *

(12) EX PARTE REEXAMINATION CERTIFICATE (11807th)
United States Patent
Chesson

(10) Number: US 10,334,320 C1
(45) Certificate Issued: Feb. 22, 2021

(54) INTERACTIVE DIGITAL PLATFORM, SYSTEM, AND METHOD FOR IMMERSIVE CONSUMER INTERACTION WITH OPEN WEB VIDEO PLAYER

(71) Applicant: Duzy IOD LLC, Florham Park, NJ (US)

(72) Inventor: Peter L. Chesson, Florham Park, NJ (US)

(73) Assignee: DUZY IOD LLC, Florham Park, NJ (US)

Reexamination Request:
No. 90/014,416, Dec. 2, 2019

Reexamination Certificate for:
Patent No.: 10,334,320
Issued: Jun. 25, 2019
Appl. No.: 15/898,916
Filed: Feb. 19, 2018

Related U.S. Application Data

(60) Provisional application No. 62/560,397, filed on Sep. 19, 2017.

(51) Int. Cl.
*H04N 21/236* (2011.01)
*H04N 21/64* (2011.01)
*H04L 12/741* (2013.01)
*H04N 21/478* (2011.01)
*H04N 21/466* (2011.01)
*G06F 3/0481* (2013.01)
*H04N 21/4725* (2011.01)

(52) U.S. Cl.
CPC ... *H04N 21/47815* (2013.01); *G06F 3/04817* (2013.01); *H04N 21/466* (2013.01); *H04N 21/4725* (2013.01)

(58) Field of Classification Search
None
See application file for complete search history.

(56) References Cited

To view the complete listing of prior art documents cited during the proceeding for Reexamination Control Number 90/014,416, please refer to the USPTO's public Patent Application Information Retrieval (PAIR) system under the Display References tab.

*Primary Examiner* — Dennis G Bonshock

(57) ABSTRACT

A digital media player and sales platform, system and method, enabled for use on the open web as well as in closed applications configured to provide end users an immersive interactive experience wherein the end users have the ability to engage with video content items, including the ability to purchase items, as and when they choose, all within the confines of the player and entirely within the viewing experience, all functionality fully enabled from the moment the media is loaded for play not tied to any media timeline or media player push to engage.

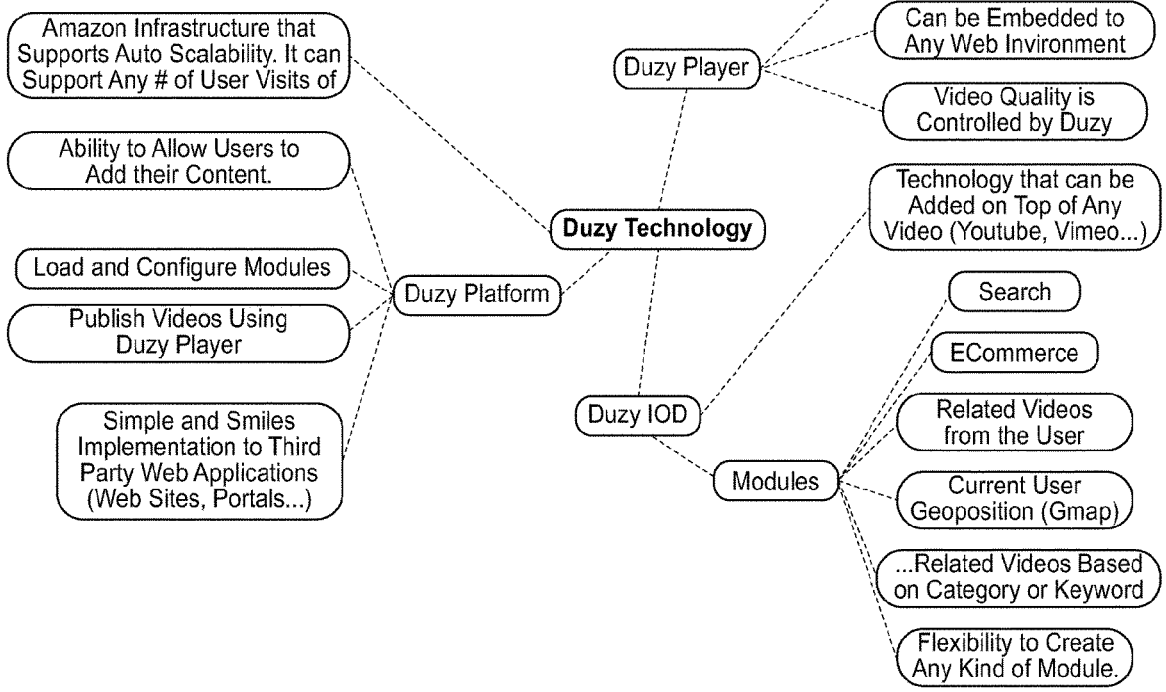

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5 and 6 are determined to be patentable as amended.

Claims 2-4 and 7-9, dependent on an amended claim, are determined to be patentable.

1. A video player comprising at least one processing device and a screen controlled by software when executed by the at least one processing device that generates a video stream displayed on said screen and configured to generate a user interface wherein said at least one processing device and software is further configured to enable end viewers to interact with cue objects pre-enabled within said video stream displayed on said screen, wherein said pre-enablement occurs in, and by configuring, a fully independent video overlay, wherein said configuring is defined through an editing platform that enables the video player controlling software to be provided with enhanced functionality by configuring interactive content modules in the fully independent video overlay wherein said fully independent video overlay is defined by products or services made available by API keys that link said products or services via a commerce platform API, wherein implementation of the overlay is carried out through an embedded player deployed via code to a media partners platform to integrate the fully independent video overlay within the video player and associate it to the cue object in the video player independent of the video stream, wherein said fully independent video overlay is timeline detached, said video player further limited wherein:

said at least one processing device and software is further configured to stream [a] *said* fully independent video overlay to allow particular images within said video stream displayed on the screen to be chosen and pre-enabled as cue objects for viewer interaction at any point in time while a viewer is viewing the video stream wherein said overlay allows said viewer interaction without video stream disruption; and said at least one processing device and software is further configured *by configuring said fully independent video overlay* to display at least one proprietary cue object on the screen that enables an end viewer to choose from interaction options comprising logging in, obtaining information about said at least one cue object, and purchasing said at least one cue object, at any point during video stream play, enabled with an overlay API that comprises an interactive payment handler module configured to collect information, display cue objects, aggregate cue objects for purchase and perform the aggregate purchase transaction by using APIs within the viewing frame overlay on the video player, and same implemented wholly within said video player and overlay, eliminating all direct, real-time linking or transfer of context, frame and/or control of said video player to any third party purveyor site; and said at least one processing device and software is further configured to display interactive icons on the screen enabling end viewers to choose from a menu of choices for interaction on demand; and said at least one processing device and software is further configured to process any number of *interactive* content modules configurable by content creators and editors to provide end users customizable interactive options; and said at least one processing device and software is further configured to enable said video player to be implemented within existing third party website portals and applications.

5. A method of advertising the method comprising the steps of:

developing media content containing at least one cue object enabled for use with a video player comprising at least one processing device and a screen controlled by software when executed by the at least one processing device that generates a video stream displayed on said screen and configured to generate a user interface wherein said at least one processing device and software is further configured to enable end viewers to interact with cue objects pre-enabled within said video stream displayed on said screen, *wherein said pre-enablement occurs in, and by configuring, a fully independent video overlay, wherein said configuring is defined through an editing platform that enables the video player controlling software to be provided with enhanced functionality by configuring interactive content modules in the fully independent video overlay wherein said fully independent video overlay is defined by products or services made available by API keys that link said products or services via a commerce platform API, wherein implementation of the overlay is carried out through an embedded player deployed via code to a media partners platform to integrate the fully independent video overlay within the video player and associate it to the cue object in the video player independent of the video stream, wherein said fully independent video overlay is timeline detached,* said video player further limited wherein:

said at least one processing device and software is further configured to stream [a] *said* fully independent video overlay to allow particular images within said video stream displayed on the screen to be chosen and pre-enabled as cue objects for viewer interaction at any point in time while a viewer is viewing the video stream wherein said overlay allows said video interaction without video stream disruption; and said at least one processing device and software is further configured *by configuring said fully independent video overlay* to display at least one proprietary cue object on the screen that enables an end viewer to choose from interaction options comprising logging in, obtaining information about said at least one cue object, and purchasing said at least one cue object, at any point during video stream play, enabled with an overlay API that comprises an interactive payment handler module configured to collect information, display cue objects, aggregate cue objects for purchase and perform the aggregate purchase transaction by using APIs within the viewing frame overlay on the video player, and same implemented wholly within said video player and overlay, eliminating all direct, real-time linking or transfer of context, frame and/or control of said video player to any third party purveyor site; and said at least one processing device and software is further configured to display interactive icons on the screen enabling end viewers to choose from a menu of choices for interaction on demand; and said at least one processing device and software is further configured to process any number of *interactive* content modules configurable by content creators and editors to provide end users customizable interactive options; and said at least one processing device and software is further configured to enable said video player to be implemented within existing third party website portals and applications;

enabling the at least one cue object to be viewable, clickable, shareable, and purchasable through said video player;

providing access to an end user of said media content and at least one cue object utilizing said video player; and analyzing, tracking and fulfilling all end viewer interactions with any of at least one cue objects interacted with while accessing said media content utilizing said video player.

6. A video player configured as a sales platform comprising at least one processing device and a screen controlled by software when executed by the at least one processing device that generates a video stream displayed on said screen and configured to generate a user interface wherein said at least one processing device and software is further configured to enable end viewers to interact with cue objects pre-enabled within said video stream displayed on said screen available for purchase from any number of purveyors, *wherein said pre-enablement occurs in, and by configuring, a fully independent video overlay, wherein said configuring is defined through an editing platform that enables the video player controlling software to be provided with enhanced functionality by configuring interactive content modules in the fully independent video overlay wherein said fully independent video overlay is defined by products or services made available by API keys that link said products or services via a commerce platform API, wherein implementation of the overlay is carried out through an embedded player deployed via code to a media partners platform to integrate the fully independent video overlay within the video player and associate it to the cue object in the video player independent of the video stream, wherein said fully independent video overlay is timeline detached,* said video player configured as a sales platform further limited wherein:

said at least one processing device and software is further configured to stream [a] *said* fully independent video overlay to allow particular images within said video stream displayed on the screen to be chosen and pre-enabled as cue objects for viewer interaction at any point in time while a viewer is viewing the video stream wherein said overlay allows said viewer interaction without video stream disruption; and said at least one processing device and software is further configured *by configuring said fully independent video overlay* to display at least one proprietary cue object on the screen that enables an end viewer to choose from interaction options comprising logging in, obtaining information about said at least one cue object, and purchasing said at least one cue object, at any point during video stream play, enabled with an overlay API that comprises an interactive payment handler module configured to collect information, display cue objects, aggregate cue objects for purchase and perform the aggregate purchase transaction by using APIs within the viewing frame overlay on the video player, and same implemented wholly within said video player and overlay, eliminating all direct, real-time linking or transfer of context, frame and/or control of said video player to any third party purveyor site; and said at least one processing device and software is further configured to process any number of *interactive* content modules configurable by content creators and editors to provide end users customizable interactive options; and said at least one processing device and software is further configured to enable said video player configured as a sales platform to be implemented within existing third party website portals and applications wherein said video player configured as a sales platform is configured through said overlay API to interact with at least one separate payment handler creating one secure link between any one end viewer and said payment handler, said payment handler additionally configured to engage a plurality of purveyors to offer preconfigured cue objects of each of said plurality of purveyors directly to any one end viewer.

\* \* \* \* \*